US006917953B2

(12) United States Patent
Simon et al.

(10) Patent No.: US 6,917,953 B2
(45) Date of Patent: Jul. 12, 2005

(54) SYSTEM AND METHOD FOR VERIFYING DATABASE SECURITY ACROSS MULTIPLE PLATFORMS

(75) Inventors: Kimberly DaShawn Simon, Austin, TX (US); Jeffrey Wijono, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 10/015,291

(22) Filed: Dec. 17, 2001

(65) Prior Publication Data

US 2003/0115446 A1 Jun. 19, 2003

(51) Int. Cl.[7] .............................................. G06F 17/30
(52) U.S. Cl. ....................................... 707/204; 707/10
(58) Field of Search .................... 707/1–10, 100–104.1, 707/200–205

(56) References Cited

U.S. PATENT DOCUMENTS

| | | | |
|---|---|---|---|
| 5,872,915 A | 2/1999 | Dykes et al. | 395/188.01 |
| 5,983,348 A | 11/1999 | Ji | 713/200 |
| 6,272,641 B1 | 8/2001 | Ji | 713/201 |
| 6,529,909 B1 * | 3/2003 | Bowman-Amuah | 707/10 |
| 6,694,338 B1 * | 2/2004 | Lindsay | 707/203 |
| 6,697,810 B2 * | 2/2004 | Kumar et al. | 707/10 |
| 2002/0049767 A1 * | 4/2002 | Bennett | 707/104.1 |

* cited by examiner

Primary Examiner—Mohammad Ali
(74) Attorney, Agent, or Firm—VanLeeuwen & VanLeeuwen; Joseph T. VanLeeuwen; David A. Mims, Jr.

(57) ABSTRACT

A system and method for verifying database security across multiple platforms is presented. Servers are queried to obtain a user id access list of a particular database, directory, or file. The user id access list is compared with a validated access list. A report file is generated that includes user id's that have access to a database, directory, or file but do not have proper permission. The report file includes a submission of how to correct each security violation.

14 Claims, 7 Drawing Sheets

SYSTEM AND METHOD FOR VERIFYING DATABASE SECURITY ACROSS MULTIPLE PLATFORMS

BACKGROUND OF THE INVENTION

1. Technical Field

The present invention relates in general to a system and method for verifying database security. More particularly, the present invention relates to a system and method for automating security checks across multiple platforms and reporting security violations and resolutions to the violations.

2. Description of the Related Art

Database administrators are confronted with maintaining security of multiple databases located on multiple servers. Many times database administrators are responsible for multiple platforms that may have a slightly different method of checking database security.

One aspect of database security is verifying that user id access lists are up-to-date. Users are frequently reassigned to different projects and no longer have a "need to know" of information contained on a particular database. Database security checks should be consistently performed to ensure that outdated user id's are removed from the database access list. Database administrators also need to perform database security checks due to malicious clients attempting to add user id's to database access lists.

Database security verification is time consuming and prone with errors when database administrators perform security checks using manual methods. Scripts are sometimes developed to provide database administrators with automated database security check processes. However, scripts have typically not been secure, may not report security violations in an organized manner, and may not offer resolutions to detected security violations.

Database administrators need to check the security aspects of backup files. Users removed from active files also need to be removed from corresponding backup files. A challenge found with using scripts for security checking purposes is that scripts typically check the primary database but do not check directories containing backup databases or log files.

What is needed, therefore, is an automated method of checking server security across multiple platforms that recommends a solution for each violation.

SUMMARY

It has been discovered that database security reliability is increased by automating security-checking procedures that automatically generate an organized report that includes each discovered security violation and a remedy to fix the violation.

A database security system includes two function blocks, a DB2 Cops security check class and a common class library. As used herein, DB2™ is a database product developed and distributed by International Business Machines Corporation and "DB2" (used throughout this application) is a trademark of International Business Machines Corporation. The DB2 Cops security check class interfaces with servers to detect security violations or to retrieve access lists. The common class library includes necessary code libraries to assist in report generation upon completion of a process run.

The DB2 Cops security check class requests and retrieves information from a server corresponding to a user's message selection criterion. The DB2 Cops security check class may query a server to detect security violations or may request information to generate access list reports. The DB2 Cops security check class interfaces with the common class library to process violation reports, message reports, and error reports. Errors are reported during processing when the database administrator specifies an invalid instance name, a database name, or if the database administrator does not have database access authority. In addition, violation reports, message reports, and error reports may be displayed on a users computer monitor.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
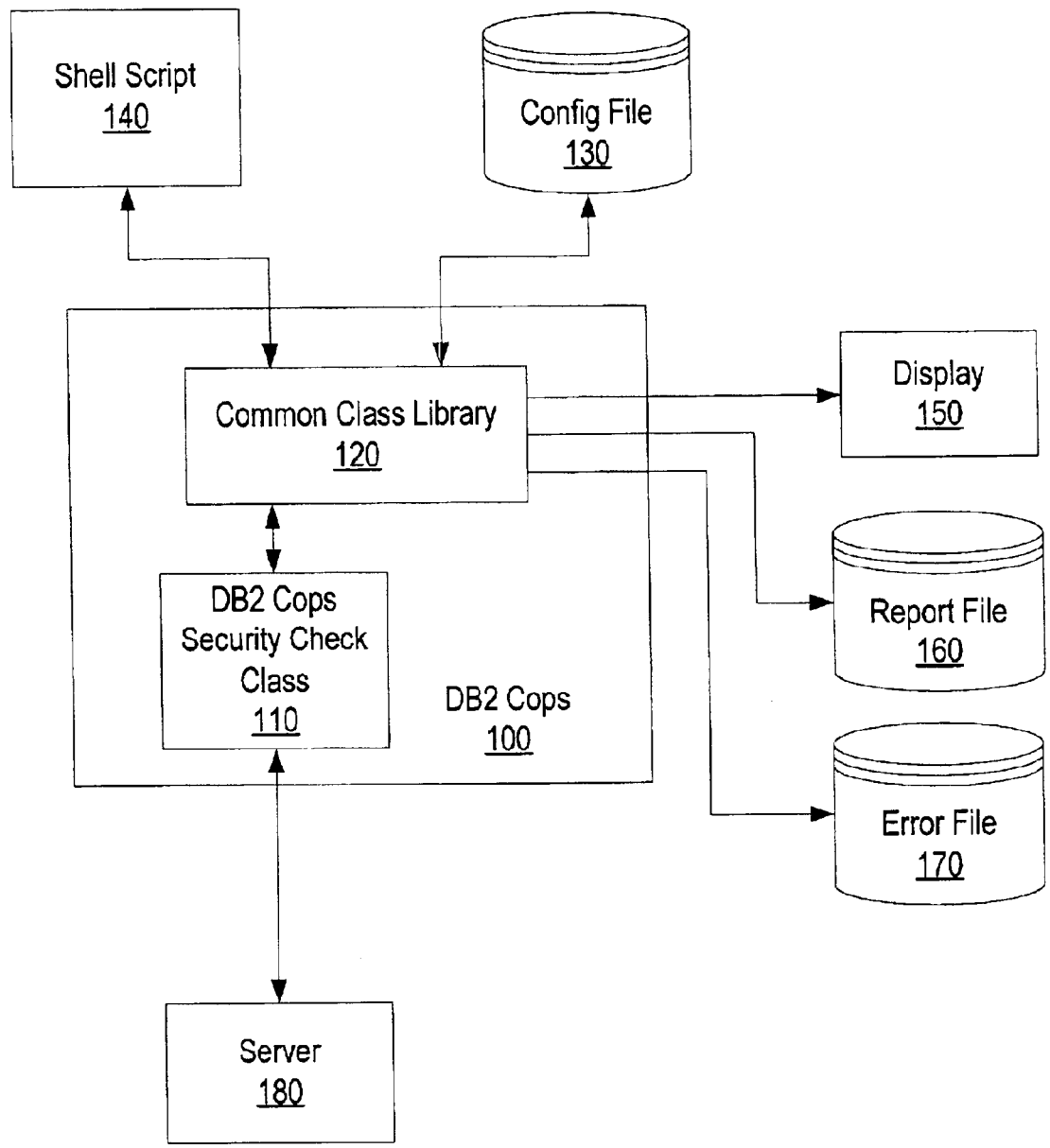
FIG. 1 is a high-level diagram showing DB2 Cops verifying database security in a server.

FIG. 1 is a high-level diagram showing DB2 Cops verifying database security in a server. DB2 Cops 100 includes two function blocks, DB2 Cops security check class 110 and common class library 120. DB2 Cops security check class 110 interfaces with servers to detect security violations or to retrieve access lists. Common class library 120 includes code libraries to assist in report generation upon completion of a process run. Shell script 130 may be used to execute a process run. For example, an administrator may use shell script 130 to check the security of a particular database on a periodic basis, such as daily. Configuration file 130 is used by common class library 120 to assist in feature executions.

DB2 Cops security check class 110 requests and retrieves information from server 180 corresponding to administrators' message selection criteria. DB2 Cops security check class 110 may query server 180 to detect security violations or may request information to generate an access list report. DB2 Cops security check class 110 interfaces with common class library 120 to process reports and store the reports in report file 160. Report file 160 may be stored in a non-volatile storage area, such as a computer hard drive. DB2 Cops security check class 110 also interfaces with common class library 120 to process error reports that are stored in error file 170. Error file 170 may be stored in a non-volatile storage area, such as a computer hard drive. Errors may occur during processing when an invalid instance name or database name is specified. Errors may also occur when a database connection fails or if the administrator does not have database authority. In addition to report generations stored in report file 160 or error file 170, message reports and error reports may be displayed on display 150.

Figure 2:
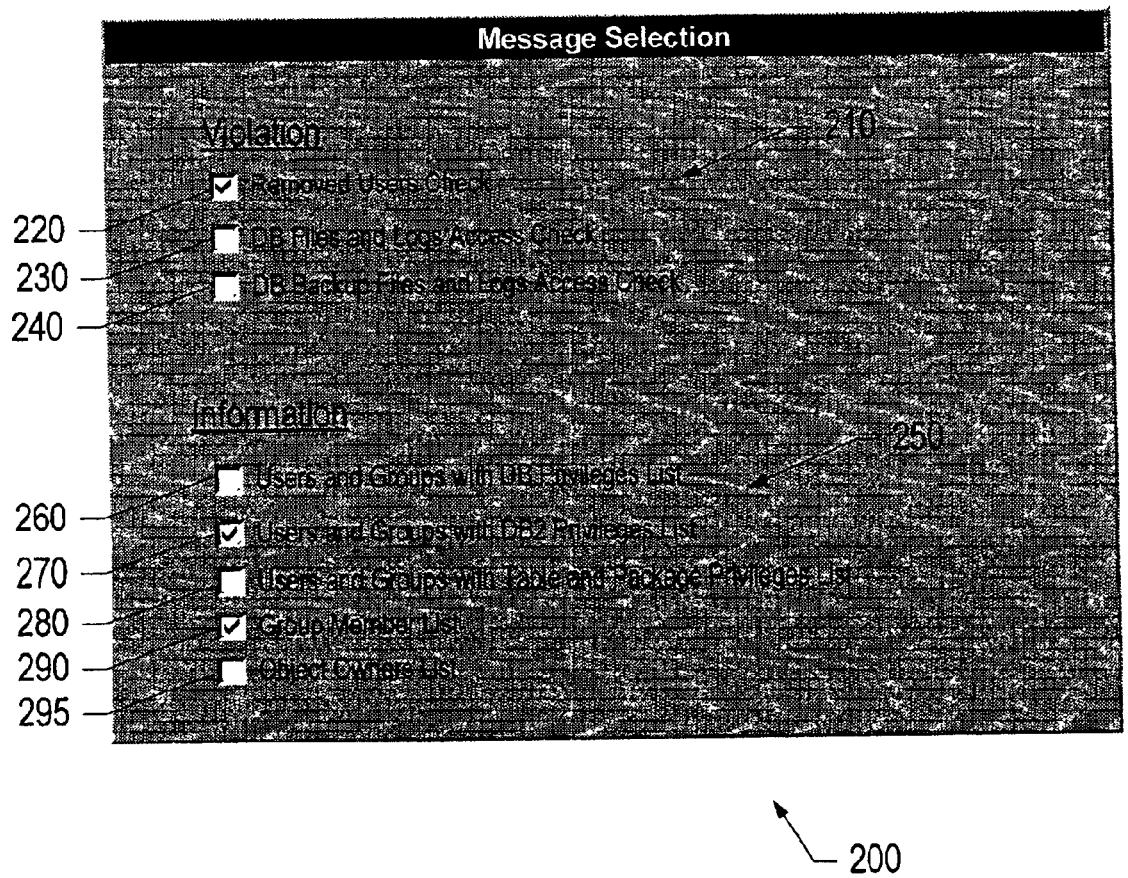
FIG. 2 is a message selection window showing different user message selections.

FIG. 2 is a message selection window showing different user message selection options. Message selection window 200 includes two message areas, violation messages area 210 and information messages area 250.

Violation messages area 210 include message selections that report security violations. Check box 220 is selected if an administrator wants a report that includes user id's that are removed from an operating system but continue to have database access privileges (see FIG. 3 for further details). Check box 230 is selected if an administrator wants a report that includes user id's that have access to directories in which they are not permitted access (see FIG. 4 for further details). Check box 240 is selected if an administrator wants a report that includes user id's that have access to backup files in which they are not permitted access (see FIG. 5 for further details).

Figure 6:
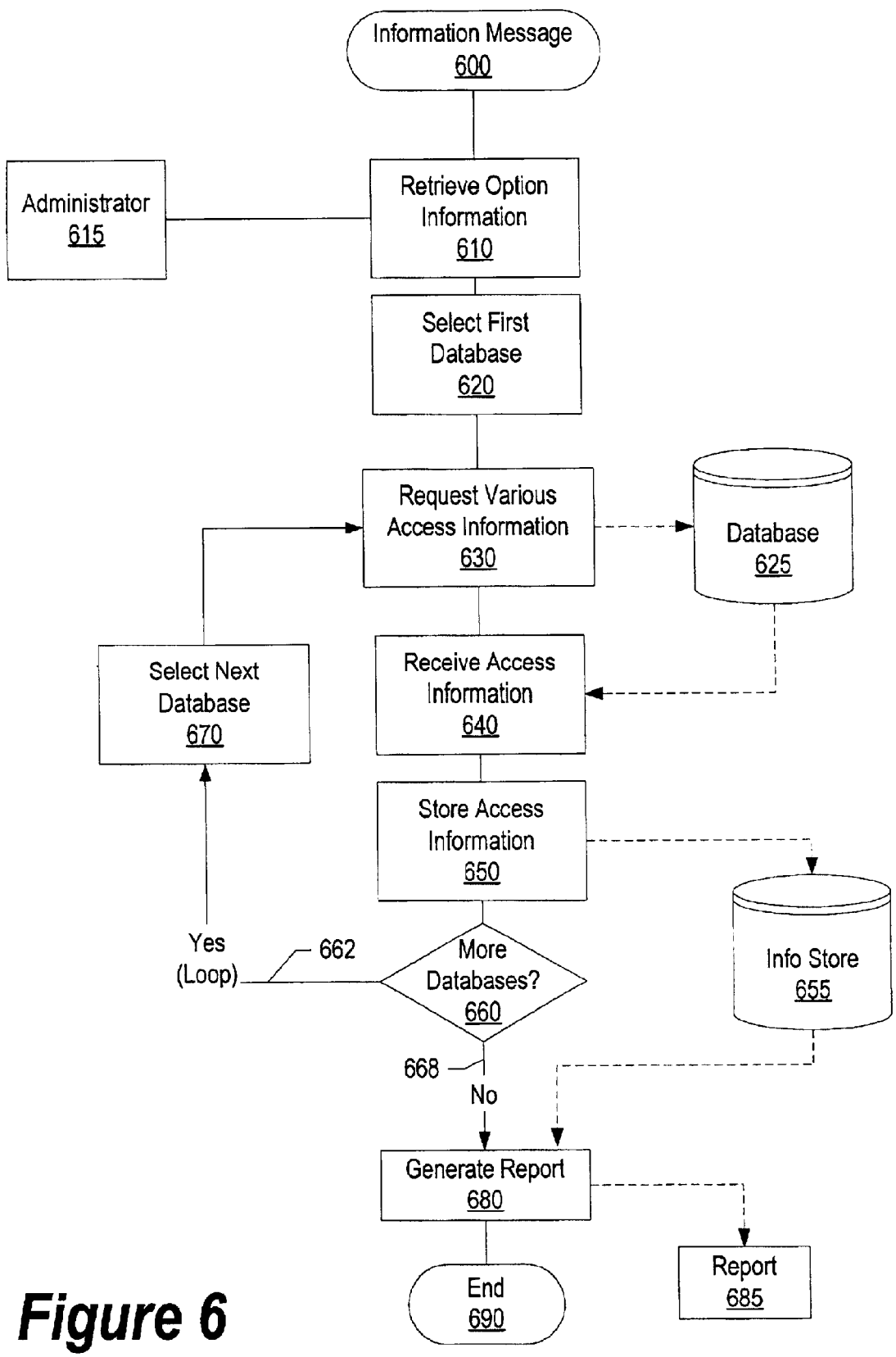
FIG. 6 is a flowchart showing a report generation of user id's which match message selection criteria.

Information messages area 250 include message selections that report user lists and group lists (see FIG. 6 for further details). Check box 260 is selected if the administrator wants a report that includes a list of users and groups with DB privileges for a specified instance or database. Check box 270 is selected if the administrator wants a report that includes a list of users and groups with DB2 privileges for a specified instance or database. Check box 280 is selected if the administrator wants a report that includes a list of users and groups that have table and package privileges for a specified instance or database. Check box 290 is selected if the administrator wants a report that includes a list of group members for a specified instance or database. Check box 295 is selected if the administrator wants a report that includes a list of database object ownership for a specified instance or database.

Each check box is independent of one another. A report is generated with the messages corresponding to the administrator's message selections.

Figure 3:
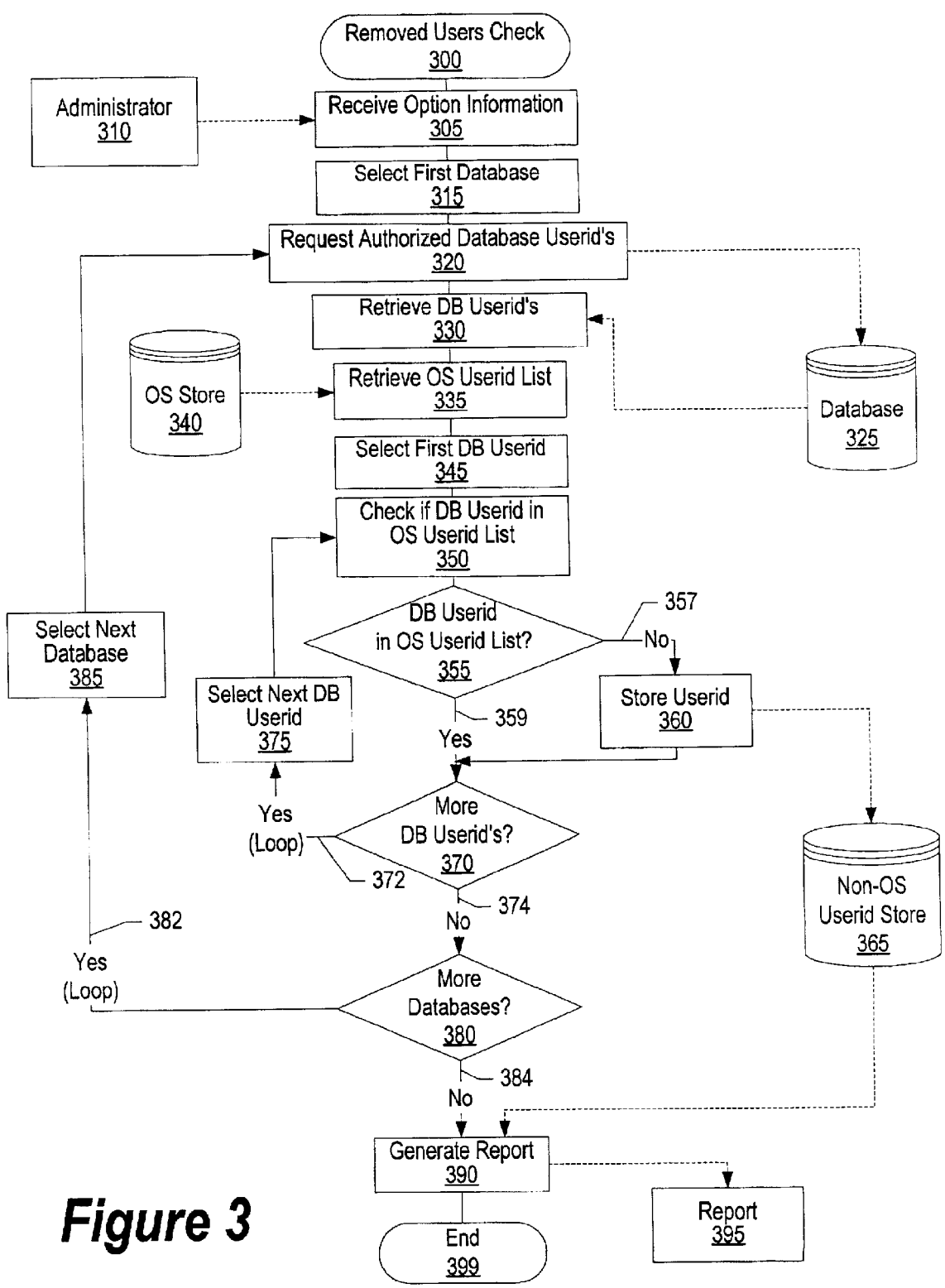
FIG. 3 is a flowchart showing a report generation of user id's that are removed from an operating system that continue to have database access privileges.

FIG. 3 is a flowchart showing a report generation of user id's that are removed from an operating system's login directory that continue to have database access privileges. Processing commences at 300, whereupon option information is received from administrator 310 (step 305). For example, option information may include the name of the instance and database in which to check security. To specify a database, the instance and database option may be specified prior to processing. To specify an entire instance, the instance option may be specified without specifying each database.

A first database is selected at step 315. A request for authorized database user id's of database 325 is initiated at step 320. Database 325 may be stored in a non-volatile storage area, such as a computer hard drive. A list of users with access to the selected database (DB user id's) is retrieved at step 330. A list of authorized user id's in operating system store 340 is retrieved at step 335.

A first DB user id with access to database 325 is selected at step 345. Processing checks if the DB user id is included in the operating system (OS) user id list at step 350. A determination is made as to whether the DB user id is in the OS user id list (decision 355).

If the DB user id is not in the OS user id list, the DB user id is in violation of DB security and decision 355 branches to "No" branch 357 whereupon the DB user id is stored in non-OS user id store 365 (step 360). Non-OS user id store may be stored in a non-volatile storage area, such as a computer hard drive. On the other hand, if the DB user id is included in the OS user id list, decision 355 branches to "Yes" branch 359, bypassing the user id storage step.

A determination is made as to whether there are more DB user id's to process in the selected database (decision 370). If there are more DB user id's to process in the selected database, decision 370 branches to "Yes" branch 372 which loops back to select the next DB user id (step 375) and process the next DB user id. This looping continues until there are no more DB user id's to process from the selected database, at which point decision 370 branches to "No" branch 374 whereupon a decision is made as to whether there are more databases to process (decision 380).

If there are more databases to process, decision 380 branches to "Yes" branch 382 which loops back to select the next database (step 385) and process the next database. This looping continues until there no more databases to process, at which point decision 380 branches to "No" branch 384.

Report 395 is generated at step 390 which includes user id's with security violations stored in non-OS user id store 365 and a remedy (i.e. remove the user id's from the corresponding database) to correct each security violation. Processing ends at 399.

Figure 4:
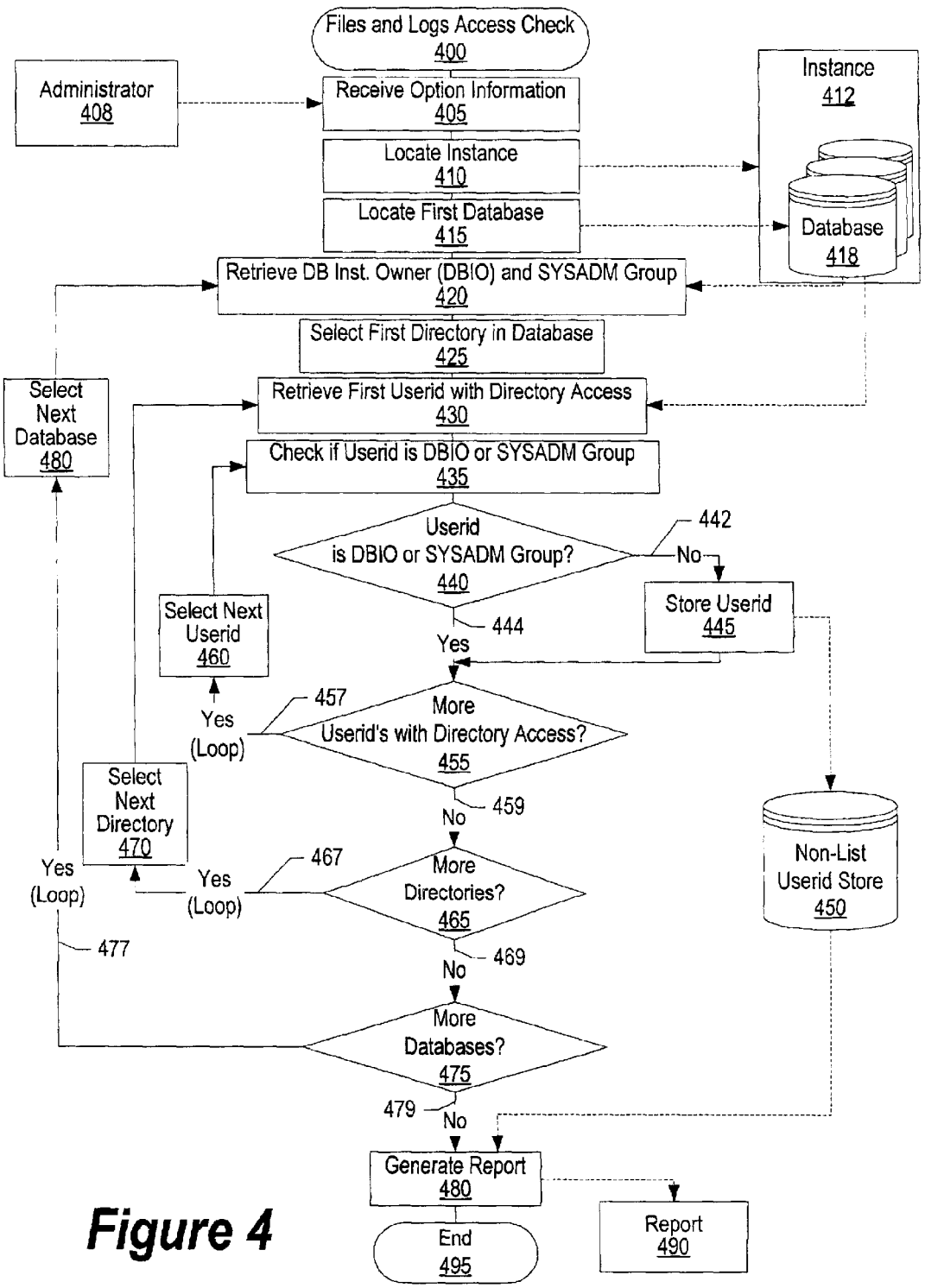
FIG. 4 is a flowchart showing a report generation of user id's that have access to directories in which they are not permitted access.

FIG. 4 is a flowchart showing a report generation of user id's that have access to directories in which they are not permitted access. Processing commences at 400, whereupon option information is received from administrator 408 (step 405). For example, option information may include the name of the instance and database in which to check security. To specify a database, the instance and database option may be specified prior to processing. To specify an entire instance, the instance option may be specified without specifying each database.

Instance 412 is located at step 410 which corresponds to option information received from administrator 408. Database 418 is located at step 415 which corresponds to option information received from administrator 408 and is included in instance 412. The DB instance owner (DBIO) and SYSADM group are retrieved which corresponds to database 418 (step 420). The first directory in database 418 is selected at step 425, and the first user id with access to the corresponding directory is retrieved (step 430).

Processing checks if the user id is the DBIO or in the SYSADM group at step 435. A determination is made as to whether the user id is the DBIO or in the SYSADM group (decision 440).

If the user id is not the DBIO or in the SYSADM group, decision 440 branches to "No" branch 442 whereupon the user id is stored in non-list user id store 450 (step 445) signifying that the user id should not have access to the directory. Non-list user id store may be stored in a non-volatile storage area, such as a computer hard drive. On the other hand, if the user id is the DBIO or in the SYSADM group, decision 440 branches to "Yes" branch 444, bypassing the user id storage step.

A determination is made as to whether there are more user id's with access to the selected directory (decision 455). If there are more user id's with access to the selected directory, decision 455 branches to "Yes" branch 457 which loops back to select (step 460) and process the next user id. This looping continues until there are no more user id's to process, at which point decision 455 branches to "No" branch 459 whereupon a decision is made as to whether there are more directories to process in the selected database (decision 465).

If there are more directories to process in the selected database, decision 465 branches to "Yes" branch 467 which loops back to select (step 470) and processes the next directory. This looping continues until there no more directories to process in the selected database, at which point decision 465 branches to "No" branch 469.

A determination is made as to whether there are more databases to process in the selected instance (decision 475). If there are more databases to process, decision 475 branches to "Yes" branch 477 which loops back to select (step 480) and process the next database. This looping continues until there are no more databases to process in the selected instance, at which point decision 475 branches to "No" branch 479.

Report 490 is generated at step 485 which includes user id's with security violations stored in non-list user id store 450 and a remedy (i.e. remove the user id's from the corresponding DB directory access list) to correct each security violation. Processing ends at 495.

Figure 5:
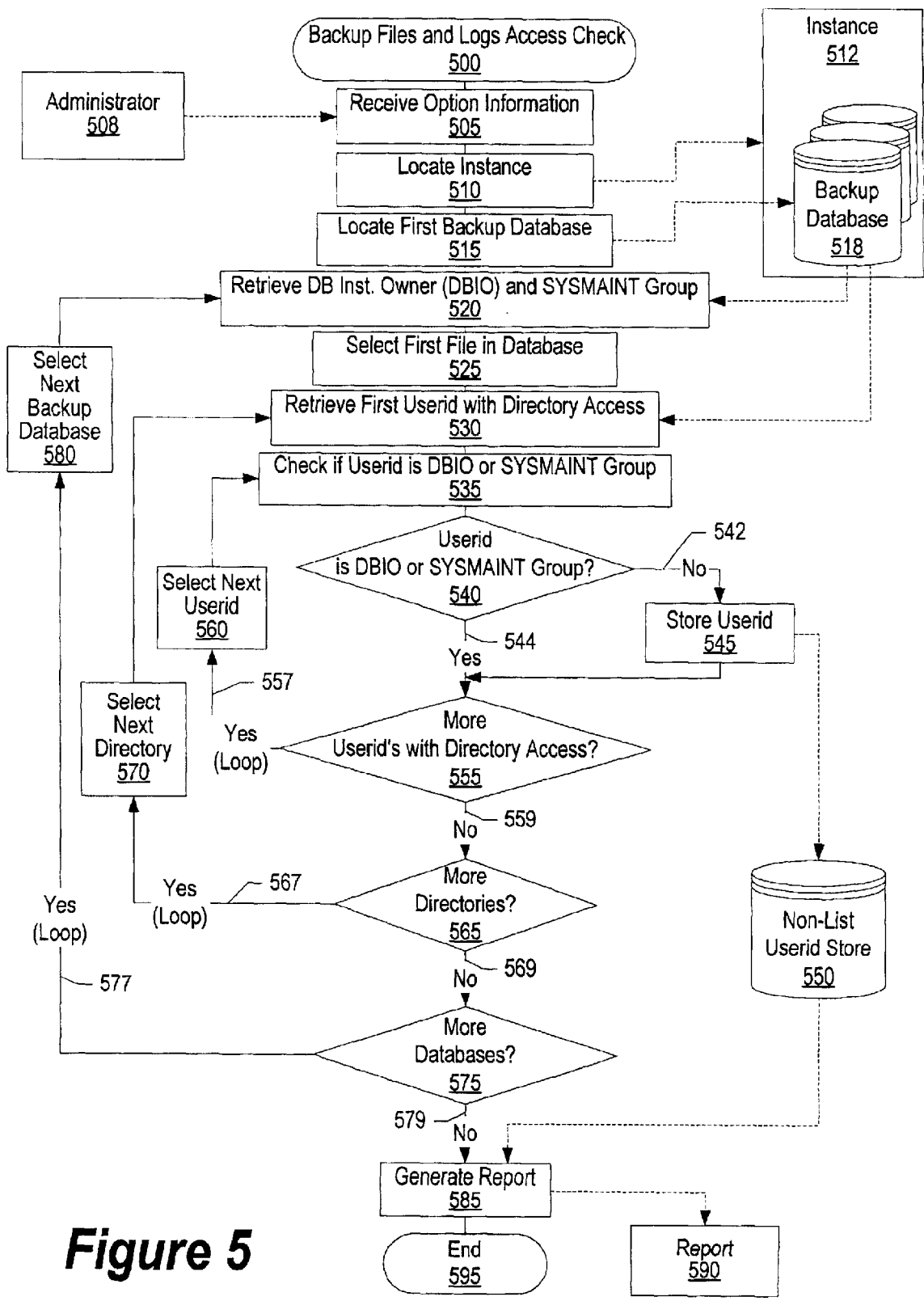
FIG. 5 is a flowchart showing a report generation of user id's that have access to backup files in which they are not permitted access.

FIG. 5 is a flowchart showing a report generation of user id's that have access to backup files in which they are not permitted access. Processing commences at 500, whereupon option information is received from administrator 508 (step 505). For example, option information may include the name of the instance and database in which to check security. To specify a database, the instance and database option may be specified prior to processing. To specify an entire instance, the instance option may be specified without specifying each database.

Instance 512 is located at step 510 which corresponds to option information received from administrator 508. Backup database 518 is located at step 515 which corresponds to option information received from administrator 508 and is included in instance 512. The DB instance owner (DBIO) and SYSMAINT group are retrieved which corresponds to the first database (step 520). The first directory in backup database 518 is selected at step 525, and the first user id with access to the corresponding directory is retrieved (step 530).

Processing checks if the user id is the DBIO or in the SYSMAINT group at step 535. A determination is made as to whether the user id is the DBIO or in the SYSMAINT group (decision 540).

If the user id is not the DBIO or in the SYSMAINT group, decision 540 branches to "No" branch 542 whereupon the user id is stored in non-list user id store 550 (step 545) indicating that the user should not have access to the directory within the backup database. Non-list user id store may be stored in a non-volatile storage area, such as a computer hard drive. On the other hand, if the user id is the DBIO or in the SYSMAINT group, decision 540 branches to "Yes" branch 544, bypassing the user id storage step.

A determination is made as to whether there are more user id's with access to the selected directory (decision 555). If there are more user id's with access to the selected directory, decision 555 branches to "Yes" branch 557 which loops back to select (step 560) and process the next user id. This looping continues until there are no more user id's to process in the selected directory, at which point decision 555 branches to "No" branch 559 whereupon a decision is made as to whether there are more directories to process in the selected backup database (decision 565).

If there are more directories to process in the selected backup database, decision 565 branches to "Yes" branch 567 which loops back to select (step 570) and processes the next directory. This looping continues until there no more directories to process in the selected backup database, at which point decision 565 branches to "No" branch 569.

A determination is made as to whether there are more backup databases to process in the selected instance (decision 575). If there are more backup databases to process in the selected instance, decision 575 branches to "Yes" branch 577 which loops back to select (step 580) and process the next backup database. This looping continues until there are no more backup databases to process in the selected instance, at which point decision 575 branches to "No" branch 579.

Report 590 is generated at step 585 which includes user id's with security violations stored in non-list user id store 550 and a remedy to correct each security violation (i.e. remove user id's from the database directory access). Processing ends at 595.

FIG. 6 is a flowchart showing a report generation of user id's which match information message selection criteria. Information message processing commences at 600, whereupon option information is retrieved from administrator 615 (step 610). For example, option information may include the selection of information message types to include in the report from specified databases or instances.

A first database is selected at step 625. Access information is requested from database 625 at step 630. For example, access information may include a list of users and groups with corresponding database privileges; a list of users and groups with corresponding DB2 privileges; a list of users and groups with corresponding table and package privileges; a list of group members for the corresponding database; and a list of database object ownership for the corresponding database.

Access information corresponding to the request is received at step 640, and stored in information store 655 (step 650). Information store 655 may be stored in a non-volatile storage area, such as a computer hard drive. A determination is made as to whether there are more databases from which to request information (decision 660). If there are more databases to process, decision 660 branches to "Yes" branch 662 which loops back to select (step 670) and process the next database. This looping continues until there are no more databases to process, at which point decision 660 branches to "No" branch 668.

Report 685 is generated at step 680 which includes user id information stored in information store 655. Processing ends at 690.

Figure 7:
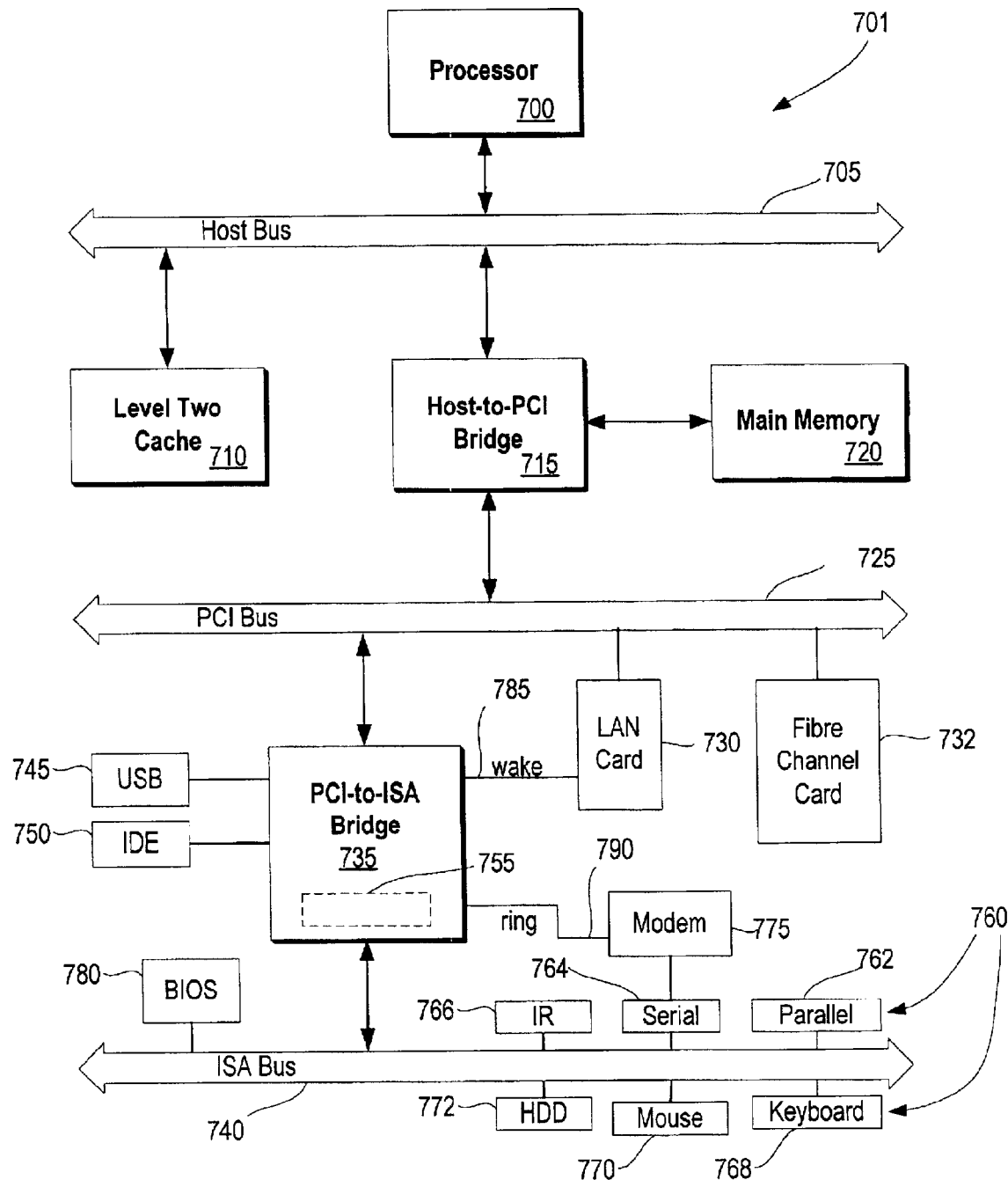
FIG. 7 is a block diagram of an information handling system capable of implementing the present invention.

FIG. 7 illustrates information handling system 701 which is a simplified example of a computer system capable of performing the server and client operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for analyzing database security, said method comprising:
    connecting to one or more servers, wherein each server includes an instance, the instance including one or more databases, wherein at least one of the databases is selected from the group consisting of a database, a backup database, and a directory of databases;
    selecting one of the databases;
    identifying a user id, wherein the user id has access to the selected databases;
    retrieving a permitted user id list corresponding to the selected database;
    determining whether the user id is included in the permitted user id list, the determining further comprising:
        identifying a violation message type wherein the violation message type is selected from the group consisting of a removed users check, a DB files and logs access check, and a DB backup files and logs access check; and
    reporting the user id in response to the determining.

2. The method as described in claim 1 further comprising:
    retrieving a resolution corresponding to the determining; and
    including the resolution in the reporting.

3. The method as described in claim 1 wherein the connection is secure.

4. The method as described in claim 1 wherein the permitted user id list is selected from the group consisting of a database instance owner, a sysadm group, and a sysmaint group.

5. The method as described in claim 1 wherein the servers are on different operating platforms.

6. An information handling system comprising:
    one or more processors;
    a memory accessible by the processors;
    one or more nonvolatile storage devices accessible by the processors; and
    a database analysis tool to analyze database security, the database analysis tool including:
        means for connecting to one or more servers, wherein each server includes an instance, the instance including one or more databases, wherein at least one of the databases is selected from the group consisting of a database, a backup database, and a directory of databases;
        means for selecting one of the databases;
        means for identifying a user id, wherein the user id has access to the selected databases;
        means for retrieving a permitted user id list corresponding to the selected database;
        means for determining whether the user id is included in the permitted user id list, the determining further comprising:

identifying a violation message type wherein the violation message type is selected from the group consisting of a removed users check, a DB files and logs access check, and a DB backup files and logs access chock; and means for reporting the user id in response to the determining.

7. The information handling system as described in claim 6 further comprising:

retrieving a resolution corresponding to the determining; and including the resolution in the reporting.

8. The information handling system as described in claim 6 wherein the permitted user id list is selected from the group consisting of a database instance owner, a sysadm group, and a sysmaint group.

9. The information handling system as described in claim 6 wherein the servers are on different operating platforms.

10. A computer program product stored in a computer operable media for analyzing database security, said computer program product comprising:

means for connecting to one or more servers, wherein each server includes an instance, the instance including one or more databases, wherein at least one of the databases is selected from the group consisting of a database, a backup database, and a directory of databases;

means for selecting one of the databases;

means for identifying a user id, wherein the user id has access to the selected databases;

means for retrieving a permitted user id list corresponding to the selected database;

means for determining whether the user id is included in the permitted user id list, the determining further comprising:

identifying a violation message type wherein the violation message type is selected from the group consisting of a removed users check, a DB files and logs access check, and a DB backup files and logs access check; and means for reporting the user id in response to the determining.

11. The computer program product as described in claim 10 further comprising:

retrieving a resolution corresponding to the determining; and including the resolution in the reporting.

12. The computer program product as described in claim 10 wherein the connection is secure.

13. The computer program product as described in claim 10 wherein the permitted user id list is selected from the group consisting of a database instance owner, a sysadm group, and a sysmaint group.

14. The computer program product as described in claim 10 wherein the servers are on different operating platforms.

* * * * *